Patented Apr. 22, 1952

2,593,417

UNITED STATES PATENT OFFICE 2,593,417

POLYMERIZATION PROCESS

Gaetano F. D'Alelio, Pittsburgh, Pa., assignor to Koppers Company, Inc., a corporation of Delaware No Drawing. Application September 24, 1949, Serial No. 117,721

28 Claims. (Cl. 260—669)

This invention relates to a process for the polymerization of polymerizable ethylenic monomers. More particularly it relates to the polymerization of polymerizable ethylenic monomers by the use of cation-exchange resins having sulfonic acid groups therein.

Generally, when strong acid, Friedel-Crafts type, or ionic-type catalysts are used for the preparation of polymers from ethylenic monomers, a troublesome separation step is encountered in the removal of the catalysts from the product. This step usually involves a dilution with water or other preferential solvent for the catalyst and sometimes a neutralization and washing out of the catalyst residues from the product, which treatment very often results in emulsions or in the carrying of some of the product into the water or solvent layer. In addition these catalysts are usually not easily recovered for reuse and therefore involve a notable expense when considerable amounts of a moderately expensive catalyst are required.

It has now been found that cation-exchange resins can be used as easily separable and easily recoverable catalysts for the polymerization of polymerizable ethylenic monomers. The cation-exchange resins which may be used advantageously for such purposes are cation-exchange resins having sulfonic acid groups therein, that is, sulfonated divinylaryl resins, e. g., sulfonated divinyl benzene resins, sulfonated styrene-divinyl benzene resins, etc., sulfonated phenol-formaldehyde resins, sulfonated coal, etc.

The process of this invention may be carried out in its simplest form by merely dispersing small amounts of the cation-exchange resin in a polymerizable ethylenic monomer at an appropriate temperature for a suitable period of time, thereafter removing the resin, e. g., by filtration, etc., and separating the polymer or oligomer from any unreacted monomer, solvents, etc., by any convenient method, e. g., fractionating the product, or stripping the unpolymerized monomer, low-boiling product or solvents. The practice of the invention is best described, however, by the following examples. These examples serve to illustrate various methods of practicing the invention and are not intended as limitations to the scope of the invention. In these examples and throughout the specification "parts" and "percent" are given in parts and percent by weight.

Example I

To a mixture of 400 parts of styrene and 100 parts of ethyl benzene at a temperature of 100° C. was added with stirring over a period of about one hour 15 parts of 100 mesh resin comprising a sulfonated styrene-divinyl benzene copolymer having approximately 0.6–0.7 sulfonic acid groups per aromatic nucleus in the copolymer. This resin can be prepared according to the procedures described in U. S. Patent 2,366,007. The reaction was exothermic, and cooling of the mixture was necessary in order to maintain the 100° C. temperature. After reaction the catalyst was filtered off and the liquid product fractionated to give 108 parts of styrene dimer (125–150° C. at 2 mm.) and 245 parts of higher boiling product. This represents a total yield of approximately 88 percent polymer.

Example II

The procedure of Example I was repeated using the same catalyst in the form of 10.20 mesh beads instead of 100 mesh. There was no rapid evolution of heat as noted in Example I, and the heating and stirring was continued for an additional hour. Removal of the catalyst beads by filtration and of the ethyl benzene solvent by distillation left a 90 percent yield of a yellow resin, but no styrene dimer was recovered.

Example III

While stirring a suspension of 20 parts of the same sulfonated styrene-divinyl benzene copolymer (100 mesh) used in Example I in 150 parts of normal heptane and maintaining at a temperature of 100° C., a mixture of 300 parts of alpha-methyl-styrene and 150 parts of normal heptane was added over a three hour period. After cooling, the catalyst was filtered off and the reaction product distilled to remove solvent and any unreacted monomer. There was 90.3% conversion of the alpha-methyl-styrene to a polymer product which boiled over 100° C. at 15 mm. pressure.

Example IV

Ten parts (100 mesh) of the same sulfonated styrene-divinyl benzene copolymer used in Example I and 100 parts of isobutylene were added to a rotating autoclave and heated to 150° C. for 12 hours at a maximum pressure of 225 p. s. i. A yield of 87.5% was obtained of which approximately 21% boiled in a diisobutylene range (95–110° C.) and approximately 69% was higher boiling.

The process of this invention may be applied to all types of polymerizable ethylenic monomers including maleates, fumarates, itaconates, acrylates, methacrylates, acrylamides, vinyl esters, vinyl halides, acrylonitrile, vinyl ethers, N-vinyl imides, N-vinyl carbazole, and advantageously the hydrocarbon monomers which are normally easily polymerized by Friedel-Crafts and acid-type polymerization catalysts, e. g. propylene, butene-1, isobutylene, isoamylene, vinyl cyclohexene, cyclopentadiene, styrene, alpha-methyl-styrene, nuclear alkylated styrenes, such as o-, m-, p-methyl-styrenes and o-, m-, p-ethyl-styrenes, etc., and corresponding derivatives of alpha-methyl-styrene, vinyl naphthalenes, vinyl diphenyls, etc. In addition, various other alkenyl aryl compounds other than hydrocarbons are advantageously polymerized by the catalysts of this invention, for example those having non-hydrocarbon nuclear substituents, e. g., chlorostyrenes, vinyl chloronaphthalenes, methoxystyrenes, vinyl methoxynaphthalenes, etc. These monomers may be polymerized individually or in mixtures containing any number of these monomers.

The polymerization products prepared by the practice of this invention may vary from liquid to solid, depending on the conditions of the polymerization and the particular monomer or mixture of monomers being used. Therefore, by selection of the monomers and the particular polymerization conditions to give a desired range of molecular weights in the polymers the products may be modified in properties to serve various uses, such as plasticizers, motor fuels, lubricants, impregnants, surface coatings, molding powders, adhesives, etc. Generally, low temperatures and low ratios of catalyst to polymerizable monomer favor high molecular weight polymers, whereas high temperatures and high catalyst-monomer ratios favor low molecular weight polymers.

As indicated by Examples I and II the particle size and surface character of the catalyst may affect the type of product, possibly due to the fact that a greater amount of catalyst surface causes greater catalyst efficiency and therefore a faster polymerization reaction, thereby giving lower molecular weight products than would otherwise be obtained. In addition, the amount of catalyst or ratio of catalyst to monomer, as previously stated, as well as temperature, solvent, etc. usually affects the character of the product. When the product is a solid, it is desirable that a solvent be present during the polymerization to aid in the separation of the product from the catalyst, or the solvent may be added later to extract the product from the catalyst residue.

The procedure for contacting the monomer with the catalyst may be varied in a number of ways. In addition to the technique described in the examples, the polymerization may be effected in a continuous manner by passing the monomer through a fixed bed of the sulfonated resin catalyst. Moreover, as indicated previously, the catalyst may be in various forms, that is, powder, beads, pellets, or impregnated or coated on an inert material, such as diatomaceous earth, Alundum, coke, silica, cinders, porous glass, etc.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

What is claimed is:

1. A process comprising the polymerization of a polymerizable mass comprising at least one polymerizable ethylenic monomer in the presence of an aryl resin containing a plurality of sulfonic acid groups.

2. A process of claim 1, in which the aryl resin is a sulfonated divinyl aryl polymer.

3. A process of claim 1, in which the aryl resin is a sulfonated styrene-divinyl benzene copolymer.

4. A process of claim 1, in which the aryl resin is a sulfonated ethyl styrene-divinyl benzene copolymer.

5. A process of claim 1, in which the polymerizable ethylenic monomer is an alkenyl aryl compound.

6. A process of claim 1, in which the polymerizable ethylenic monomer is an alkenyl aryl hydrocarbon.

7. A process of claim 1, in which the polymerizable ethylenic monomer is an isopropenyl aryl compound.

8. A process of claim 1, in which the polymerizable ethylenic monomer is alpha-methyl-styrene.

9. A process of claim 8, in which the sulfonated aryl resin is a sulfonated divinyl aryl polymer.

10. A process of claim 8, in which the sulfonated aryl resin is a sulfonated divinyl benzene polymer.

11. A process of claim 1, in which the polymerizable ethylenic monomer is a vinyl aryl compound.

12. A process of claim 1, in which the polymerizable ethylenic monomer is a vinyl aryl hydrocarbon.

13. A process of claim 1, in which the polymerizable ethylenic monomer is styrene.

14. A process of claim 13, in which the aryl resin is a sulfonated divinyl aryl polymer.

15. A process of claim 13, in which the aryl resin is a sulfonated divinyl benzene polymer.

16. A process of claim 13, in which the aryl resin is a sulfonated styrene-divinyl benzene copolymer.

17. A process of claim 13, in which the aryl resin is a sulfonated ethyl styrene-divinyl benzene copolymer.

18. A process of claim 1, in which the polymerizable ethylenic monomer is an unsaturated non-aromatic hydrocarbon having at least three carbon atoms.

19. A process of claim 1, in which the polymerizable ethylenic monomer is isobutylene.

20. A process of claim 19, in which the aryl resin is a sulfonated divinyl aryl polymer.

21. A process of claim 19, in which the aryl resin is a sulfonated divinyl benzene polymer.

22. A process comprising the polymerization of a polymerizable mass comprising at least one polymerizable ethylenic monomer in the presence of a sulfonated aryl resin at a temperature less than 150° C.

23. A process comprising the polymerization of a polymerizable mass comprising at least one polymerizable alkenyl aryl compound in the presence of a sulfonated aryl resin at a temperature less than 150° C.

24. A process comprising the polymerization of a polymerizable mass comprising styrene in the presence of a sulfonated aryl resin at a temperature less than 150° C.

25. A process comprising the polymerization of a polymerizable mass comprising alpha-methyl-styrene in the presence of a sulfonated aryl resin at a temperature less than 150° C.

26. A process comprising the polymerization of a polymerizable mass comprising isobutylene in the presence of a sulfonated aryl resin at a temperature less than 150° C.

27. A process of claim 1, in which the aryl resin is in bead form.

28. A process of claim 6, in which the aryl resin is in bead form.

GAETANO F. D'ALELIO.

REFERENCES CITED

The following references are of record in the file of this patent:

Nachod (ed.): "Ion Exchange" (Academic Press, 1949), pages 264–267.